United States Patent Office 3,337,401
Patented Aug. 22, 1967

3,337,401
COMPOSITIONS AND METHODS FOR THE TREATMENT AND PREVENTION OF COCCIDIOSIS IN POULTRY
Toshio Ishii and Yasuto Takamatsu, Tokyo, Shojiro Yurugi, Kyoto, and Katsutada Masuda, Ashiya, Japan, assignors to Takeda Chemical Industries Ltd., Osaka, Japan
No Drawing. Filed June 29, 1965, Ser. No. 468,145
Claims priority, application Japan, June 29, 1964, 39/37,133
10 Claims. (Cl. 167—53.1)

The present invention relates to a method of treating and preventing coccidiosis in poultry, and more particularly to a method of treating and preventing coccidiosis in poultry which comprises administering to poultry a composition which contains thiazolium quaternary salt of the formula

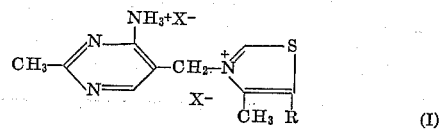

wherein R stands for a lower alkyl group and X− stands for a halogen ion.

The lower alkyl group represented by R in the foregoing formula is, for example, methyl, ethyl, propyl, isopropyl or the like.

The halogen ion represented by X− in the said formula is chlorine ion, bromine ion or iodine ion.

As is widely known, the treatment and prevention of coccidiosis have been considered as one of the most important problems in poultry production. The casual parasite of coccidiosis in poultry is known to be Coccidium (Eimeria sp.) belonging to Sporozoa, and is present chiefly in the intestinal walls of poultry. In a number of cases the bird attacked by the disease lingers on for weeks or even months before becoming so weak and anaemic that it dies from exhaustion. Mortality varies between 2 percent and 10 percent of the kinds affected, and generally speaking, the younger the bird, the more likely is it that it succumbs. Heretofore, the art has endeavored to treat the disease, and there have been introduced various anti-coccidial drugs such as arsenic compounds, nitrofurazone, bisphenol, sulfa drugs, and pyrimidinylmethyl imidazolium salts. The known anti-coccidial drugs, however, are not free from such defects as weak activity and strong unfavorable side effect. Therefore, treatment with the hitherto-known anti-coccidial drugs is not satisfactory.

Particularly, in comparison with pyrimidinylmethyl imidazolium salt, a typical compound of which is 1-(2-propyl-4-amino - 5 - pyrimidinylmethyl-2-methylpyridinium chloride hydrochloride, a thiazolium salt according to the present invention has the following advantageous characteristics:

(a) It is remarkable in its effect of increasing body weight of poultry, and (b) Its effect of decreasing the number of oocysts is such that it is remarkable in anti-coccidial effect in a range of rather low concentration, while 1-(2-propyl-4-amino-5-pyrimidinylmethyl)-2-methylpyridinium chloride hydrochloride is ineffective in such a low concentration.

Although many attempts have been made to overcome the prior art difficulties, none, as far as the present inventors are aware, has been entirely successful when carried into practical use.

The present inventors have found that the thiazolium quaternary salts (I), mentioned above, have anti-coccidial effect against said Coccidium (Eimeria sp.) and that, as a result, they (1) possess a remarkable preventive and curative effect for coccidiosis which, as stated, is a fatal disease in poultry and (2) make possible adequate disease prevention without unfavorable effect upon the growth of the treated poultry.

It is an object of the present invention to provide a new method by which coccidiosis in poultry can be prevented or cured. Among the further objects of the present invention is the provision of new compositions which contain as active ingredient thiazolium salt of the above-mentioned Formula I and are useful for treatment and prevention of coccidiosis in poultry.

Other objects and advantages of the present invention will become apparent from the following description taken in conjunction with the examples.

Typical compounds of the thiazolium quaternary salts (I) constituting the active anti-coccidial agents of the compositions of the invention comprise, for example:

3-(2-methyl-4-amino-5-pyrimidinylmethyl)-4,5-dimethyl-thiazolium salt, 3-(2-methyl - 4 - amino-5-pyrimidinylmethyl)-4-methyl-5-ethylthiazolium salt, 3-(2-methyl - 4 - amino-5-pyrimidinylmethyl)-4-methyl-5-propylthiazolium salt, etc.

A composition according to the present invention comprises thiazolium quaternary salt (I) dispersed in or admixed with a suitable carrier or diluent as an active anti-coccidial ingredient. As carrier or diluent, it is preferred to use one which is not reactive with the active ingredient and which can be administered with safety to the poultry. Carriers or diluents suitable for the present compositions include, for example, wheat shorts, wheat flour, corn meal, soybean mill feed, soybean flour, vegetables, ground shells, fish meal, soybean grits, dried grains, fermentation residues, rice-bran, potato, starch, lactose, sucrose, glucose, fructose, molasses solubles, antibiotic mycelia, vitamines, crushed limestone, clay and the like.

Optimum concentration of the present composition depends to some extent on the kind of thiazolium salt employed, the kind of poultry or the purpose of the administration of the composition, that is, prevention or curing. The composition of any desired concentration may be prepared by selecting proper diluents and by determining the proper ratio of carrier to active ingredient. In general, formulations containing from about 0.0016% to about 0.025%, preferably from about 0.0063% to about 0.0125% by weight of active ingredient (I) in poultry diets or water are suitable for prevention of the disease. When the thiazolium quaternary salts (I) are employed as therapeutic agents, the higher concentrations are preferably used. It is preferred that intermediate formulations of a certain concentration be prepared in advance by using suitable diluents or carriers, and that the thus previously prepared intermediate formulations be added to the finished feed in adminstration to poultry. As the concentration of the intermediate formulations, about 1% to 30% by weight of thiazolium quaternary salt is convenient.

For the purpose of giving those skilled in the art a better understanding of the invention, the following illustrative examples are given.

EXAMPLE 1

Test procedures (1) Chicks: Nine-day-old White Leghorn males, obtained when one-day-old from a single commercial hatchery and isolated as far as possible from the risk of extraneous coccidial infections, were used. They were weighed and divided into several groups consisting of five chicks each. The mean weight of each group of chicks was carefully balanced.

(2) Infections: Each chick was inoculated orally into the crop with approximately 100,000 sporulated oocysts of *Eimeria tenella*.

(3) Administered compounds: As test compound, 3-(2-methyl - 4-amino-5-pyrimidinylmethyl)-4,5-dimethylthiazolium chloride hydrochloride was employed in the concentrations of 0.0125, 0.0063 and 0.0031% in the diet. As a control compound, 3-(2-methyl-4-amino-5-pyrimidinylmethyl)-5-methylthiazolium chloride hydrochloride was used. This control compound was employed in the concentrations of 0.025, 0.0125 and 0.0063% in diet. The diet containing said compound was administered to each group from 24 hours before the inoculation of oocyst to the end of the test.

(4) Observations: Body weights, mortality and bloody droppings in each group were recorded daily until the end of the test. Eight days after oocyst inoculation, all the survivors were sacrificed and examined pathologically.

(5) Explanation of findings set forth in Tables 1 and 2:
Bloody droppings: Average drops of blood excreted from the intestine of each chick belonging to a group.

Increasing rate of body weight:

$$\left(\frac{\text{Average body weight at the finish}}{\text{Average body weight at the start}} - 1\right) \times 100$$

Result

The result is shown in Table 1.

EXAMPLE 2

In this test run, the effect of 3-(2-methyl-4-amino-5-pyrimidinylmethyl)-4,5-dimethylthiazolium chloride hydrochloride was compared with that of 1-(2-propyl-4-amino-5-pyrimidinylmethyl)-2-methylpyridinium chloride hydrochloride, which is probably the best commercially available anti-coccidial drug. In Table 2, the former compound is shown as compound [I], and the latter as compound [II]. The experimental procedures and descriptions in Table 2 are the same as in Example 1, except that for infection each chick was inoculated orally into the crop with approximately 50,000 sporulated oocysts of *Eimeria tenella*.

(7) Discussion: As clarified in the said tables, it was observed that 3-(2-methyl-4-amino-5-pyrimidinylmethyl)-4,5-dimethylthiazolium chloride hydrochloride possesses substantially preventive effect against *Eimeria tenella* at the concentration of 0.01% by weight. Furthermore, no unfavorable effect of the Compounds I was observed at all.

TABLE 1

| | Percent by weight (of compound in diet) | Bloody droppings | | | | Severity of caecal lesions (percent) | | | | Oocysts | | Increasing rate of body weight (percent) | Mortality (percent) |
|---|---|---|---|---|---|---|---|---|---|---|---|---|---|
| | | 4 days after | 5 days after | 6 days after | 7 days after | ++ | + | ± | − | Oocyst output (×10⁴) | Rate of sporulation (percent) | | |
| Test Group (Test compound). | 0.0125 | ----- | ----- | ----- | ----- | ----- | ----- | 20 | 80 | (¹) | 0 | 97.9 | 0 |
| | 0.0063 | ----- | ----- | 0.8 | ----- | ----- | 80 | 20 | ----- | 70 | 14.4 | 101.1 | 0 |
| | 0.0031 | ----- | ----- | 0.4 | ----- | ----- | 80 | 20 | ----- | 340 | 8.9 | 110.6 | 0 |
| Control Group (Control compound). | 0.025 | ----- | 1.6 | 2.6 | ----- | 40 | 60 | ----- | ----- | 310 | 58.1 | 86.5 | 0 |
| | 0.0125 | 0.8 | 4.4 | 2.8 | ----- | 100 | ----- | ----- | ----- | 390 | 48.7 | 77.9 | 0 |
| | 0.0063 | 1.8 | 6.0 | 2.0 | ----- | 100 | ----- | ----- | ----- | 400 | 67.5 | 78.4 | 20 |
| Infectious control | 0 | 2.0 | 8.0 | 1.4 | ----- | 100 | ----- | ----- | ----- | 360 | 72.2 | 77.1 | 40 |
| Non-infectious control. | 0 | ----- | ----- | ----- | ----- | ----- | ----- | ----- | 100 | 0 | 0 | 127.4 | 0 |

¹ Hardly observable.

TABLE 2

| | Percent by weight (of compound in diet) | Body weight (average) at— | | Increasing rate of body weight | Growth ratio of weight gain during test period | | Bloody droppings, days after— | | | | Mortality (percent) | Severity of caecal lesions (percent) | | | | Oocyst output (×10⁴) |
|---|---|---|---|---|---|---|---|---|---|---|---|---|---|---|---|---|
| | | Start | Finish | | To infectious control | To noninfectious control | 4 | 5 | 6 | 7 | | ++ | + | ± | − | |
| Compound (II) | 0.00625 | 54.2 | 100.0 | 84.5 | 139.9 | 80.9 | 0 | 0 | 0 | 0 | 0 | ----- | 20 | 10 | 70 | 240 |
| | 0.003125 | 53.8 | 99.6 | 85.1 | 140.9 | 81.4 | 0 | 0 | 0 | 0 | 0 | ----- | 60 | ----- | 40 | 670 |
| | 0.0015625 | 53.8 | 100.8 | 97.4 | 144.7 | 83.6 | 0 | 0 | 0.4 | 0 | 0 | 100 | ----- | ----- | ----- | 1,240 |
| Compound (I) | 0.00625 | 53.6 | 120.0 | 123.9 | 205.1 | 118.6 | 0 | 0 | 0 | 0 | 0 | ----- | 20 | ----- | 80 | (¹) |
| | 0.003125 | 53.6 | 115.6 | 115.7 | 191.6 | 110.7 | 0 | 0 | 0 | 0 | 0 | 20 | 40 | ----- | 40 | 500 |
| | 0.0015625 | 53.6 | 108.0 | 101.5 | 168.0 | 97.1 | 0 | 0 | 0 | 0 | 0 | 80 | 20 | ----- | ----- | 820 |
| Infectious control | 0 | 53.6 | 86.0 | 60.4 | 100 | 57.8 | 2.0 | 4.0 | 1.2 | ----- | 60 | 100 | ----- | ----- | ----- | 1,090 |
| Non-infectious control | 0 | 53.6 | 109.6 | 104.5 | 173.0 | 100 | ----- | ----- | ----- | ----- | ----- | ----- | ----- | ----- | 100 | 0 |

¹ Hardly observable.

Severity of caecal lesions (shown by the following symbols according to the results of observation):

−—normal; no lesions
±—slight
+—slight; less than 10 pin-point hemorrhages
++—severe; ceca greatly distended with blood or caseous core, caecal wall uniformly very thick.

Oocyst output: Number of oocysts in 1 gram of caecal contents.

Rate of sporulation. To the caecal contents, 2% aqueous solution of potassium bichromate, the volume being 10 times as much as the contents, was added. Then the contents were incubated at 28° C. for 3 days, and the percentage of the sporulated oocysts relative to all the oocysts in the contents were calculated.

In the following examples of formulation of the present compositions, "part" or "parts" is shown on the weight basis.

EXAMPLE 3

| | Parts |
|---|---|
| 3-(2-methyl-4-amino-5-pyrimidinylmethyl) - 4,5 - dimethylthiazolium chloride hydrochloride | 25 |
| Wheat flour | 75 |

EXAMPLE 4

| | Parts |
|---|---|
| 3-(2-methyl-4-amino-5-pyrimidinylmethyl) - 4,5 - dimethylthiazolium chloride hydrochloride | 10 |
| Soybean flour | 85 |
| Sucrose | 5 |

EXAMPLE 5

| | Parts |
|---|---|
| 3-(2-methyl - 4 - amino - 5 - pyrimidinylmethyl)-4-methyl-5-ethylthiazolium chloride hydrochloride | 20 |
| Fermentation residue | 80 |

EXAMPLE 6

| | Parts |
|---|---|
| 3-(2-methyl-4-amino-5-pyrimidinylmethyl) - 4,5 - dimethylthiazolium chloride hydrochloride | 45 |
| Lactose | 35 |
| Sucrose | 20 |

EXAMPLE 7

| | Parts |
|---|---|
| 3-(2-methyl - 4 - amino - 5 - pyrimidinylmethyl)-4-methyl-5-ethylthiazolium chloride hydrochloride | 1 |
| Grain flour | 88 |
| Calcium carbonate | 11 |

EXAMPLE 8

| | Parts |
|---|---|
| 3-(2-methyl-4-amino-5-pyrimidinylmethyl) - 4,5 - dimethylthiazolium chloride hydrochloride | 50 |
| Vitamin B$_1$ | 5 |
| Sucrose | 45 |

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

If the effective amount, i.e. anti-coccidial amount, of the thiazolium salt to be administered according to the present invention is calculated in terms of the amount per 100 grams of the body weight of the poultry, it may also be expressed as about 0.5 to 10 milligrams, more preferably about 1 to 5 milligrams, per 100 grams of the body weight of the poultry.

Having thus disclosed the invention, what is claimed is:

1. A method of treating coccidiosis in poultry, which comprises orally administering to poultry infected therewith an anti-coccidial amount of thiazolium salt of the formula

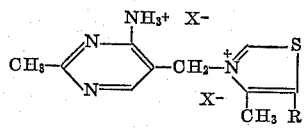

wherein R is a lower alkyl group of carbon atom number of 1 to 3 and X$^-$ is a halogen ion.

2. A method of treating coccidiosis in poultry, which comprises orally administering to poultry infected therewith a composition consisting essentially of a carrier and thiazolium salt of the formula:

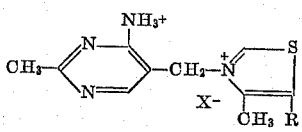

wherein R is a lower alkyl group of carbon atom number of 1 to 3 and X$^-$ is a halogen ion, the concentration of the salt in said composition being from about 0.0016% to about 0.025% by weight.

3. A method of treating coccidiosis in poultry, which comprises orally administering to poultry infected therewith an anti-coccidial amount of 3-(2-methyl-4-amino-5-pyrimidinylmethyl)-4,5-dimethylthiazolium chloride hydrochloride.

4. A method of treating coccidiosis in poultry, which comprises orally administering to poultry infected therewith a composition consisting essentially of a carrier and 3-(2-methyl-4-amino-5-pyrimidinylmethyl) - 4,5 - dimethylthiazolium chloride hydrochloride, the concentration of the salt in said composition being from about 0.0016% to about 0.025% by weight.

5. A method of preventing coccidiosis in poultry, which comprises orally administering to the poultry an anticoccidial amount of thiazolium salt of the formula

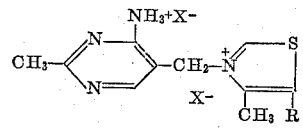

wherein R is a lower alkyl group of carbon atom number of 1 to 3 and X$^-$ is a halogen ion.

6. A method of preventing coccidiosis in poultry, which comprises orally administering to the poultry a composition consisting essentially of a carrier and thiazolium salt of the formula:

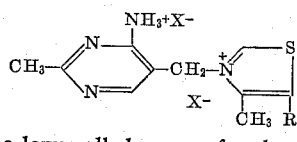

wherein R is a lower alkyl group of carbon atom number of 1 to 3 and X$^-$ is a halogen ion, the concentration of the salt in said composition being from about 0.0016% to about 0.025% by weight.

7. A method of preventing coccidiosis in poultry, which comprises orally administering to the poultry an anticoccidial amount of 3-(2-methyl-4-amino-5-pyrimidinylmethyl)-4,5-dimethylthiazolium chloride hydrochloride.

8. A method of preventing coccidiosis in poultry, which comprises orally administering to the poultry a composition consisting essentially of a carrier and 3-(2-methyl - 4 - amino - 5 - pyrimidinylmethyl) - 4,5 - dimethylthiazolium chloride hydrochloride, the concentration of the salt in said composition being from about 0.0016% to about 0.025% by weight.

9. A composition for treating and preventing coccidiosis in poultry, which consists essentially of thiazolium salt of the formula

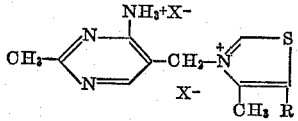

wherein R is a lower alkyl group of carbon atom number of 1 to 3 and X$^-$ is a halogen ion, and a carrier, the concentration of the salt in said composition being from about 0.0016% to about 0.025% by weight.

10. A composition for treating and preventing coccidiosis in poultry, which consists essentially of 3-(2-methyl-4-amino-5-pyrimidinylmethyl) - 4,5 - dimethylthiazolium chloride hydrochloride and a carrier, the concentration of the salt in said composition being from about 0.0016% to about 0.025% by weight.

References Cited

UNITED STATES PATENTS 3,088,867  5/1963  Rogers et al. _____ 167—53.1

OTHER REFERENCES

Chem. Abstracts, vol. 55, p. 10458(b), 1961.

ALBERT T. MEYERS, *Primary Examiner.*

JULIAN S. LEVITT, SAM ROSEN, *Examiners.*

N. G. MANN, STANLEY J. FRIEDMAN,
*Assistant Examiners.*